Dec. 20, 1966  B. INNOCENTI  3,292,651
GAS FLOW CONTROLLING DEVICE
Filed Sept. 18, 1963  2 Sheets-Sheet 1
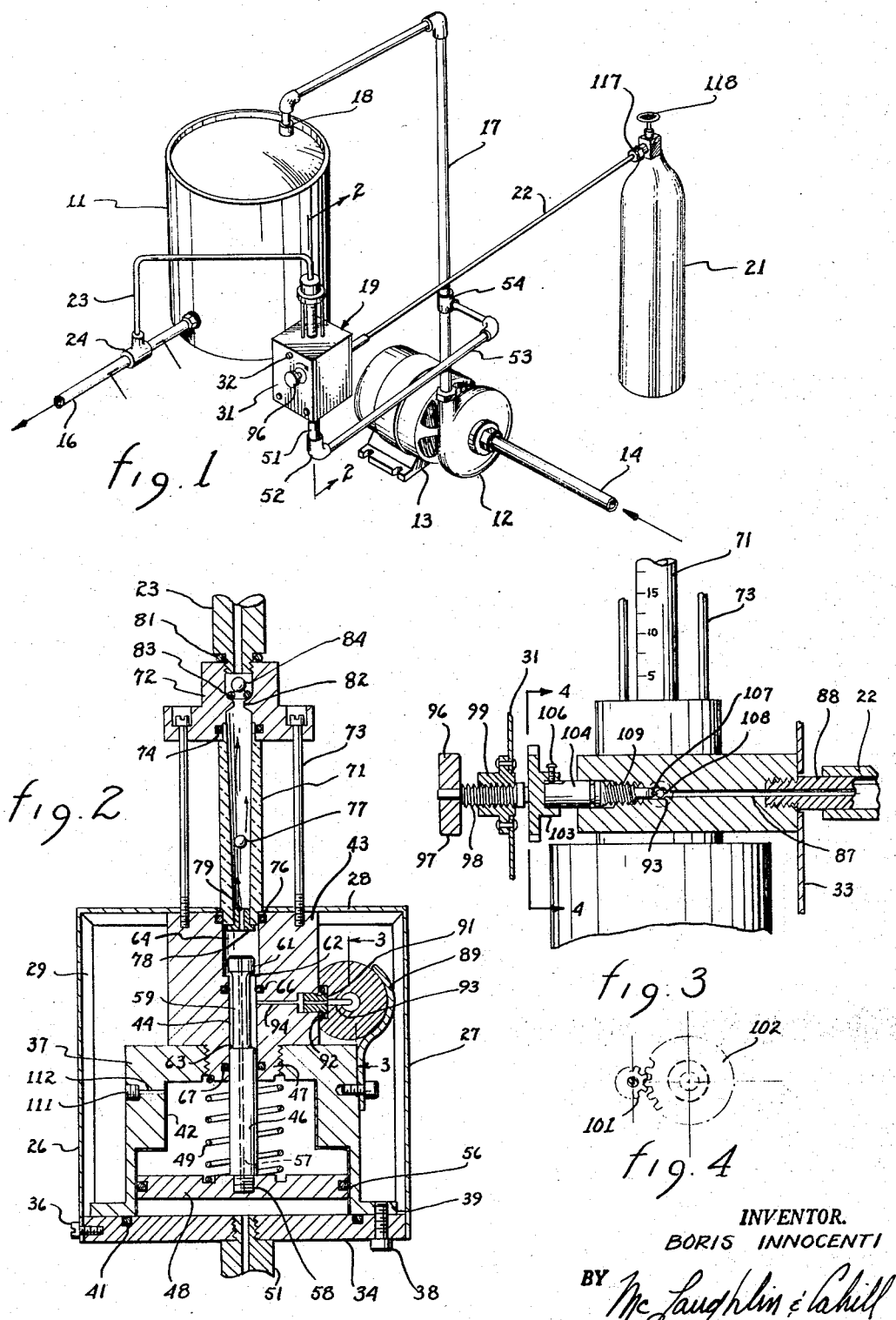
INVENTOR.
BORIS INNOCENTI
BY McLaughlin & Cahill
ATTORNEYS

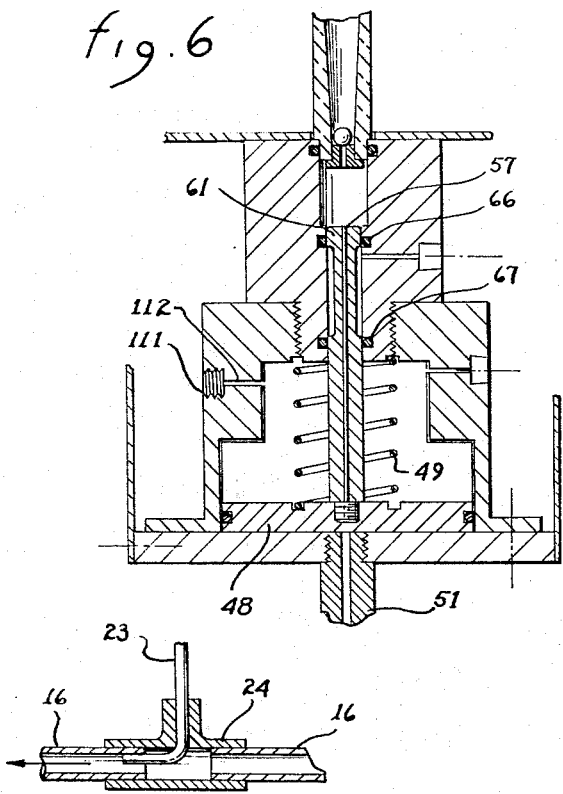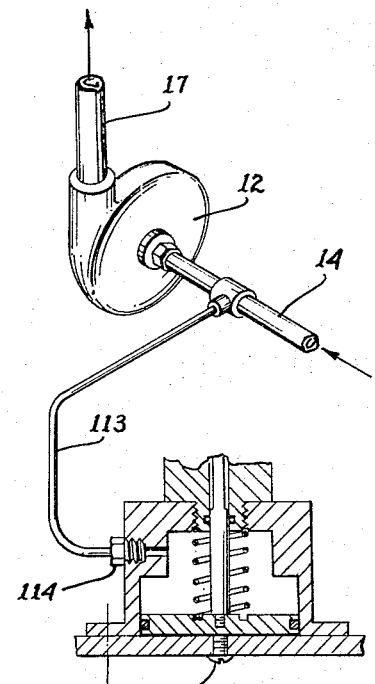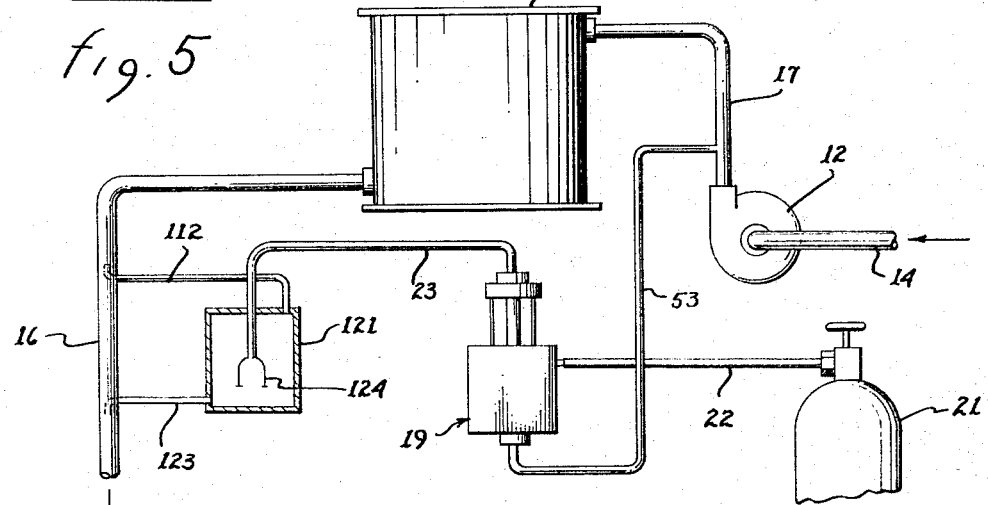

United States Patent Office 3,292,651
Patented Dec. 20, 1966

3,292,651
GAS FLOW CONTROLLING DEVICE
Boris Innocenti, 4115 N. 42nd Place,
Phoenix, Ariz. 85008
Filed Sept. 18, 1963, Ser. No. 309,769
6 Claims. (Cl. 137—111)

My invention relates in general to gas flow controlling devices and more in particular to control of chlorine delivered to swimming pools and the like.

Gas flow meters in the form of tubes with tapered inside surfaces and a ball valve neatly engaging a smallest diameter portion of the taper at the bottom of the tube are known and have been used for controlling gas flow including the flow of chlorine delivered to swimming pools. In the past it has been very difficult to make effective use of a flow meter of the type identified even on relatively large size pools. Control equipment utilizing such flow meters has been ineffective for several reasons, among them being the difficulty of discontinuing flow of chlorine gas when water circulation ceases. Another problem resides in the fact that chlorine is normally vended in large steel cylindrical tanks having a pressure of 200 pounds or thereabouts at ordinary room temperature and a greatly increased pressure when they are exposed to ambient summer temperatures alongside a swimming pool. Unless the gas is suitably valved off so that the gas delivered to the metering tube is at a relatively low pressure and normally would have a relatively low rate of flow, the ball valve will be carried to the top of the tapered cylinder and the actual gas flow will be greatly in excess of that required. Usually when attempts are made to meter off excessive amounts of gas by closing a valve such as a needle valve the reduction will be much greater than desired. Even when pressure reducing devices of one kind or another are used, the relative pressure in rate of flow is so sensitive and critical that good results are very difficult to obtain. Too great a flow of chlorine will, of course, result in excess amounts of chlorine in the pool water with the usual results of irritation to the eyes and nose and also usually the building up of an acid pH which must then be controlled by the addition of an alkaline material such as soda ash.

Many suggestions have been made based upon water pressure differential for controlling the rate of flow or discontinuing it entirely when circulation of water ceases. The use of diaphram valves in such controls usually requires employment of a needle valve, and needle valves are very difficult to control with a high degree of accuracy particularly when gas pressure of a relatively high order is to be retained. Other problems involve the deposition of solids from the water of the pool in various portions of the equipment. The deposition of solids has the effect of either causing failure of the device or requiring rapid replacement of parts because as a rule cleaning of calcareous deposits from surfaces of equipment is difficult to impossible.

The principal object of my invention is the provision of an improved gas flow controlling device.

Another object is the provision of a unitary control device which may be installed as such as a part of the regular swimming pool equipment to deliver chlorine gas to the water of a swimming pool or the like.

Still another object is the provision of very accurate control of the flow of chlorine to a flow meter forming a part of the gas controlling mechanism.

A further object is to accomplish positive shut-off of all gas flow at any time that circulation of water is discontinued.

A still further object is the provision of a unitary chlorinator capable of being operated in response to pressure on the discharge side of a pump or vacuum on the intake side of a pump to deliver chlorine gas in accurately measured volume to a water delivery line leading to swimming pool.

Other specific objects and features of the invention will be apparent from the following detailed description taken with the accompanying drawings wherein FIG. 1 is a schematic view partially broken away showing an installation embodying the unitary chlorinator of the present invention;

FIG. 2 is an enlarged fragmentary sectional view taken on the line 2—2 of FIG. 1 looking in the direction of the arrows;

FIG. 3 is a fragmentary sectional view taken on the line 3—3 of FIG. 2;

FIG. 4 is a sectional view partly in elevation, looking along the line 4—4 of FIG. 3;

FIG. 5 is a fragmentary enlarged sectional view taken on the line 5—5 of FIG. 1;

FIG. 6 is a fragmentary sectional view similar to FIG. 5, but showing the shut off valve in closed position;

FIG. 7 is a fragmentary sectional view, and partly a perspective view, showing the manner in which the shut off valve may be operated in response to pump suction; and FIG. 8 shows a modified system employing the same unitary chlorinator as FIG. 1.

Referring now to FIG. 1, the system there shown includes a standard type filter 11, a water circulating pump 12, and a pump driving motor 13, the arrangement being such as to draw water from a pool through a line 14 and to deliver it back to the pool through a line 16. The filter may be of any suitable type and on the assumption that it is a sand and gravel filter which can be cleaned by back-flushing, the output of the pump 12 is delivered by means of line 17 to the top of the filter and into the filter through a suitable fixture 18.

The unitary chlorinator of my present invention is identified generally by reference character 19. It receives chlorine gas from a standard type of tank 21 through a tube 22 and delivers the same to the line 16 through a tube 23. Various expedients can be employed in delivering the chlorine to the water line but I show in FIGS. 1 and 5 a T 24 set into the return line 16, with the tube 23 sealed through the upper leg of T and pointing downstream as indicated by the arrow in FIG. 5 to facilitate entrainment of the gas by the water.

The unit 19 comprises a three sided housing with sides 26 and 27 and a top 28, each with side edges inturned to provide reinforcing strips 29. A front cover plate 31 is attached in position by screws 32 and a rear housing plate 33 is also suitably attached as by means of screws, rivets, or the like.

A base 34 formed of suitable plastic provides the sixth side of the housing and the side members are secured thereto in any suitable manner such as by screws 36. An actuating cylinder 37 is mounted on the base by means of Allen screws 38 which extend through the base 34 and into an annular skirt 39 forming a part of the actuating cylinder. Thus, the base 34 acts as a cover for the cylinder. Any suitable seal, such as a large O-ring 41 is provided between the actuating cylinder and base or cylinder cover 34.

Actuating cylinder 37 may be formed of various materials but I have found very good results to be obtainable by fabricating the cylinder itself of brass or bronze and applying to its inside surface a uniform, water impermeable coating 42 of suitable plastic. I have founnd so-called teflon resins particularly suitable for producing this inside coating 42.

Within the housing, but above the actuating cylinder 37, I provide a shut-off valve body 43 of generally cylindrical shape but having a central opening 44 within which a valve stem 46 is vertically reciprocable. The shut-off valve body has an exteriorly threaded bottom projection 47 which engages female threads in an opening at the top of the actuating cylinder 37, so that for all practical purposes, the actuating cylinder 37 and shut-off valve body 43 become a single piece member within which the shut-off valve stem 46 is vertically reciprocable with a piston 48 which has limited travel in the largest diameter portion of the actuating cylinder 37. A compression spring 49 engaging above the piston 48 and below the shut-off valve body 43 biases the piston 48 in a downward direction. A nipple 51 attached to an elbow 52 receives water from a pipe 53 connected at 54 to the outlet side of the pump by means of suitable fittings such as shown. The nipple 51 is adapted to deliver water to the actuating cylinder 37 below the piston 48. Suitable sealing means is provided between the edge surface of the piston 48 and the inside surface of the cylinder wall to prevent water leakage. In the drawings I show a large O-ring 56 engaged in an annular edge recess of the piston 48, and I have found this arrangement very suitable for my purpose.

The shut-off valve stem 46 is preferably formed of teflon plastic. This same material is preferably also used for the shut-off valve body 43. The latter is rather massive and will support itself without deformation. The relatively small diameter shut-off valve stem 46, however, may have a tendency to buckle in use, but it definitely has a tendency to buckle when machined to finished form. I, therefore, provide a central reinforcing wire core 57 shown in dotted lines in FIG. 2, but shown in full lines in FIG. 6. This wire core is preferably inserted before the valve stem 46 is finished by drilling a hole through its center and then pressing the non-deformable wire core 57 into position. The shut-off valve stem can then be finished with great accuracy as it must be to perform its necessary functions.

Looking further at FIG. 2, it will be noted that the shut-off valve stem is of substantially uniform cross-section, except at its base 58 where it attaches to the piston 48 and at an upper intermediate portion 59 where it is of reduced diameter. This leaves a head 61 with a shoulder 62 between the head and the reduced diameter portion. A second shoulder 63 is at the bottom end of the reduced diameter portion. It will be noted that the central opening 44 has an upper portion 64 of somewhat increased diameter. In the part of the opening of normal diameter are a pair of O-rings 66 and 67, each disposed in an annular internal recess in the shut-off valve body 43. This structure comprising the shut-off valve stem, the enlarged portion 64, and the O-ring 66 and 67 functions to control the flow of chlorine through tube 23 so that as long as water is circulating through the pipe system shown, chlorine is delivered thereto, but when the circulation ceases, flow of chlorine will also cease. This mechanism and its function will be referred to further in connection with explanation of operation.

A tapered glass tube 71 is supported between the shut-off valve body 43 and a head member 72 by means of a plurality of long screws 73 which extend through an annular skirt forming a part of the head 72 and are threaded through the top wall 28 of the housing and into the shut-off valve body 43. O-rings 74 and 76 seal the ends of the interiorly tapered glass tube 71 against an inside shoulder of the head 72 and a shoulder provided on the glass tube 71 shown in FIG. 2. A ball 77 made of suitable material such as plastic to ride upwardly on a stream of gas has a diameter such that it approximately fills the inside of the tapered tube at its lowermost position. An insert 78 at the bottom end of the glass tube 71 is provided with a narrow vertical orifice 79 through which gas delivered to the passageway 64 passes and enters the inside of the interiorly tapered glass tube 71.

A central opening in the head 72 is interiorly threaded to receive the tube 23, a sealing O-ring 81 being provided in a recessed top portion of the head 72. A restricted diameter portion 82 also supports an O-ring 83 against which a ball 84 is adapted to engage in the manner of a check valve to prevent any possible backward movement of gas, water or vapor when flow of chlorine gas is discontinued.

A generally cylindrically shaped plastic regulating valve body 86 has a longitudinal passageway 87 through which chlorine gas is adapted to be delivered from the tube 22 and through a detachable nipple 88. Associated with the plastic body 86 is a regulating mechanism as will be described so that the plastic body 86 may more properly be identified as the regulating valve body.

The regulating valve body 86 has intermediate its ends a portion of its outside surface shaped to engage the outside surface of the shut-off valve body 43 as indicated particularly in FIG. 2. A bracket 89 holds the regulating valve body in position and an O-ring retaining sleeve 91 supports an O-ring 92 in sealing position as FIG. 2 shows. A transverse passageway 93 in the regulating valve body 86 is aligned with a transverse passageway 94 in shut-off valve body 43. A passageway through the O-ring retaining sleeve 91 places the passageways 93 and 94 in communication with each other and the longitudinal passageway 87 in the regulating valve body 86 is thereby placed in communication with the central opening 44 between the O-rings 66 and 67.

To regulate the amount of gas flowing through the device and to the glass tube 71, I provide an exterior adjusting knob 96 which is fixed on a stem 97 which stem has a threaded portion 98 threaded into a boss 99 carried by the front plate 31. Stem 97 has a spur gear 101 secured to its forward end and this spur gear engages a gear 102 of larger diameter carried by a hub 103 which in turn is secured to a valve stem 104 by means of a screw 106. The valve stem has a forward needle valve 107 which is adjusted to a position with respect to a seat 108 by means of an intermediate threaded portion 109 adjustable with respect to a matching threaded portion in the regulating valve body 86. The pitch of threads 98 and 109 is the same but one set of threads is left handed and the other right handed so that the relative positions of the spur gear 101 and larger gear 102 remains the same and they are always in mesh. This arrangement results in the valve stem 104 making only a partial rotation while the stem 97 is rotated through 360°. The gear ratio may be as high as 10 to 1, or even higher, and since the adjusting knob 96 is itself of relatively large diameter with respect to the valve stem, the operating stem 97 can readily be moved through one or two degrees of arc and this represents a very small movement of the needle valve 107. By this means I am able to regulate very accurately the amount of gas delivered from the tank 21 to the glass tube 71.

A plug 111 closes a port and passageway 112 communicating with the chamber within the actuating cylinder 37 at a point above the piston 48. This provides a mechanism for connecting a tube 113 (FIG. 7) to the intake pipe 14 through a suitable fitting 114. When the hookup is made in this manner, a plug 116 is employed to close the bottom opening in a base plate 34 through which the tube 51 will normally deliver water under pressure into the cylinder but below the piston 48. In employing the device of the present invention, it is first assembled as a complete unit 19 and may then be connected into the system in the manner shown in FIG. 1. Until the pump 12 is actuated by energization of the motor 13, the parts will remain in the position shown in FIG. 6. This is due to the fact that the biasing spring 49, which is in compression, will move the piston 48 substantially to a position against the base plate 34. At this point, the rounded shoulders 62 will have permitted movement of the stem past the O-ring 66 without any danger of dislodging it. The head 61 then forms a tight seal against O-ring 66 and any gas which may be in the system is held between the two O-rings 66 and 67. It will be noted that in both the FIG. 2 and FIG. 6 positions, the O-ring 67 is engaged by the larger diameter portion of the shut-off valve stem 46. There is therefore no time during which gas will leak past the valve stem 46 and lodge in the area above piston 48.

As soon as the system is started by energizing the motor 13, water will be drawn from the pool through the line 14 and delivered through the line 17 to the filter and thence into the line 16 for return to the pool. Since the tube 51 is in communication with the pressure line 17 through the pipe 53, water will immediately flow into the cylinder 37 below the piston 48 to thus raise the piston and stem 48 against the compression of spring 49. In the position shown in FIG. 2 it will be noticed that the head 61 has now cleared the O-ring 66 and any gas which is delivered through the transverse passageways 93 and 94 can flow around the head, move through the orifice 79 and into the measuring tube 71. As the relatively small jet of gas passing through the orifice 79 engages the ball valve 77, it raises this ball valve away from its seat and propells it upwardly to a position which is dependent upon the force with which the jet stream strikes the ball. Since the taper within the glass tube 71 causes the internal diameter to be greater toward the upper end of the glass tube 71, more gas will flow through the block 72 and into the tube 23 as the ball is moved higher. This means, of course, that the volume of gas delivered to the pool will be increased as the pressure and rate of flow through the orifice 79 increases.

It will be noted by reference to FIG. 3 that the glass tube 71 is suitably calibrated so that the rate of gas through it can be predetermined by the position of the ball 77. A calculation is made with respect to the volume of a pool being treated and a determination from available tables of how much chlorine is needed to maintain a suittable residue of chlorine at all times to prevent the growth of various organisms such as algae, and to sterilize the pool water. Normally, a restricted orifice is provided within a fitting 117 to cut down the dynamic pressure of gas in the system by limiting the flow through such orifice and, of course, controlling the flow by means of the conventional valve 118 usually supplied on gas tanks. The knob 96 is then turned in a direction to either separate the needle valve 107 further from its seat or bring it closer to its seat, depending on where the ball 77 settles. Since the threads 98 in the embodiment shown are left hand threads, knob 96 would be turned in a clockwise direction to turn the stem 104 in a direction to open the valve. Because of the gearing arrangement described in connection with the spur gear 101 and the larger gear 102, very minute adjustment of the position of the needle valve 107 is possible and extremely precise control of the position of the ball 77 is thus obtainable. Having determined the proper rate of flow for a given installation and given circumstances including the bathing load and other factors having a bearing on the condition of the water, further adjustment of the knob 96 is unnecessary and gas will continue to flow through the tube 23 and into the water return line 16 as long as the pump 12 is operating.

At times there may be an advantage in operating on the suction side of the pump and this may be accomplished by removing plug 111 and substituting the fitting 114 with the tube 113 connected to the suction side of the pump 12. The opening in the base plate 34 to which the tube 51 is normally attached now must be closed by means of the plug 116 and the device is ready for operation. In FIG. 7 the view of the chlorinator is fragmentary but it should be understood that all of the parts shown, for example in FIGS. 2, 3, and 6, be shown in the installation. The gas flow is adjusted in precisely the same manner as discussed in connection with the utilization of pressure from the line 17.

FIG. 8 is for all practical purposes identical with the installation of FIG. 1 except for minor changes as will be explained. The same reference characters have been applied as used in FIG. 1 for convenience and to save lengthy explanation. Instead of running the tube 23 directly into the return line 16, it is directed into a mixing chamber 121 which receives water from a line 122 upstream of a mixing chamber 121 and delivers water, now laden with chlorine, downstream of the mixing chamber by means of a discharge pipe 123. A bell shaped member 124 or other suitable instrumentality may be employed to produce an irregular bubbling action so that one can see at a glance that chlorine is being fed to the mixing chamber. This requires only that the portion of the mixing chamber or all of it, as the case may be, comprises clear glass or clear plastic not affected by chlorine. When the metering tube 71 is exposed and available for inspection, gas flow, as well as the rate of flow, can be determined also by the position of the ball 77. FIG. 8 is illustrative of the fact that the device of my present invention can be employed in any conventional system with or without indicating mechanism and in all instances will function reliably with its setting. Those skilled in the art are, of course, aware of the fact that from time to time traces of foreign matter may find their way into a chlorine tank or into the water so as to cause a deviation in the adjustment and resulting rates of flow. Deviation will, of course, occur also with change in temperature and increase or decrease of pressure within the tank 21. Normally, adjustment is made to daytime conditions where losses of chlorine are greatest. Reduced chlorine feeding at night will very seldom cause any problem.

A significant feature of the present invention is the unusual functioning of the shut-off valve. In this connection design of the shut-off valve stem and its relation to the shut-off valve body and the O-rings forming a seal against the head 61 are important. I have found that the shut-off valve provides a very complete seal so that there is no leakage of gas even when the pressure is relatively high. On the other hand, when the valve is opened by raising of the stem, a surge of gas can take place through the orifice 94 and past the head 61 for delivery to a point of use without at any time unseating the O-ring 66. Other constructions heretofore employed in which a similar seal has been used have had the disadvantage that a quick surge of gas will unseat the O-ring or other packing gland and render the valve inoperative. The shut-off valve of my present invention, therefore, is novel per se and has advantages in fields other than in the control of chlorine, wherever it is necessary to control fluid flow. When the fluid being controlled is nitrogen for example or some other fluid inert to the valve body, the valve body and valve stem may be made of other types of materials such as, for example, aluminum, brass, or other metal. Materials should be selected that, considering lubricants available, easy movement of the valve stem will occur.

I have described my invention in detail so that those skilled in the art may understand the manner of practicing the same but the scope of the invention is defined by the claims.

What is claimed is:

1. In a gas flow control device for controlling introduction of chlorine gas into water in process of circulation under pressure, said gas flow control device including
    (a) a source of gas under pressure,
    (b) visual means indicating rate of gas flow,
    (c) a gas flow regulating valve between said source and said visual flow indicating means, (d) a shut-off valve between said regulating valve and said indicating means comprising
   (1) a shut-off valve body with a vertical cylindrically shaped opening therein, said opening including a portion of relatively small diameter and a portion of relatively large diameter,
   (2) a shut-off valve stem vertically reciprocable in said opening in said valve body, said shut-off valve stem having a portion of reduced diameter with a head portion at one end of the reduced diameter portion,
   (3) said shut-off valve body having a gas passing orifice communicating with said cylindrical opening in the area of said valve stem reduced diameter portion,
   (4) said valve stem proportioned to have its said head projecting into the relatively large diameter portion when in raised position and in said relatively small diameter portion when in a lower position to prevent gas flow around said head in said raised position,
   (5) and means for lowering the position of said valve stem to shut off said gas when water circulation ceases,
(e) said shut-off valve body and shut-off valve stem being formed of plastic material which is not deleteriously affected by the said gas,
(f) and a reinforcing metal rod extending axially substantially through said shut-off valve stem.

2. In a chlorinator for controlling introduction of chlorine gas into water in process of circulation under pressure, said chlorinator including,
(a) a base plate,
(b) an actuating cylinder supported on said base plate and having an open bottom closed by said base plate,
(c) a generally cylindrical shut-off valve body with a bottom annular threaded projection threaded into a top wall of said actuating cylinder,
(d) said valve body having a circular central vertical opening extending entirely therethrough and communicating with said actuating cylinder, said central opening having an upper portion of enlarged diameter,
(e) a piston vertically reciprocable in said actuating cylinder,
(f) a compression spring in the cylinder normally biasing said piston to a bottom position in said cylinder,
(g) a vertical shut-off valve stem with its bottom end secured centrally of said piston, said stem extending into said central opening in the shut-off valve body,
(h) means forming a reduced diameter portion of said shut-off valve stem and providing a top head above the reduced diameter portion, said stem proportioned to cause said head to extend into said upper portion of the opening of enlarged diameter when the piston is moved upwardly,
(i) regulating valve means, including a passageway leading to said central opening at said reduced diameter portion of said valve stem, for receiving chlorine gas from a source under pressure and delivering the same at a reduced pressure to said shut-off valve body,
(j) an interiorly, downwardly tapered tube supported above said shut-off valve body and having its inside in communication with said central opening,
(k) an indicating ball within said tapered tube, and
(l) means providing a connection between said actuating cylinder and a differential pressure source associated with a pump, to raise the piston and permit gas flow when the pump is operating.

3. In a chlorinator for controlling introduction of chlorine gas into water in process of circulating under pressure, said chlorinator including,
(a) a base plate,
(b) an actuating cylinder supported on said base plate and having an open bottom closed by said base plate,
(c) a generally cylindrical shut-off valve body with a bottom annular threaded projection threaded into a top wall of said actuating cylinder,
(d) said valve body having a circular central vertical opening extending entirely therethrough and communicating with said actuating cylinder, said central opening having an upper portion of enlarged diameter,
(e) a piston vertically reciprocable in said actuating cylinder,
(f) a compression spring in the cylinder normally biasing said piston to a bottom position in said cylinder,
(g) a vertical shut-off valve stem with its bottom and secured centrally of said piston, said stem extending into said central opening in the shut-off valve body,
(h) means forming a reduced diameter portion of said shut-off valve stem and providing a top head above the reduced diameter portion, said stem proportioned to cause said head to extend into said upper portion of the opening of enlarged diameter when the piston is moved upwardly,
(i) regulating valve means, including a passageway leading to said central opening, for receiving chlorine gas from a source under pressure and delivering the same at reduced pressure to said shut-off valve body,
(j) a flow indicator including an interiorly, downwardly tapered tube supported above said shut-off valve body and having its inside in communication with said central opening with an indicator ball in said tapered tube, and a ball check valve above said tapered tube,
(k) means providing a source of water under pressure communicating with said cylinder below said piston to raise the piston and valve stem to permit gas flow around said head and into said tapered tube flow indicator,
(l) top and bottom O-rings in said central opening in said valve body, said valve stem being in contact with said bottom O-ring throughout all vertical movement of said valve stem,
(m) said compression spring functioning to lower the piston and valve stem when water circulation is discontinued, said valve stem proportioned to cause its said valve stem head to engage said top O-ring when said piston and valve stem are so lowered.

4. In a chlorinator for controlling introduction of chlorine gas into water in process of circulation under pressure, said chlorinator including,
(a) a base plate,
(b) an actuating cylinder supported on said base plate and having an open bottom closed by said base plate,
(c) a generally cylindrical shut-off valve body with a bottom annular threaded projection threaded into a top wall of said actuating cylinder,
(d) said valve body having a circular central vertical opening extending entirely therethrough and communicating with said actuating cylinder, said central opening having an upper portion of enlarged diameter,
(e) a piston vertically reciprocable in said actuating cylinder,
(f) a compression spring in the cylinder normally biasing said piston to a bottom position in said cylinder,
(g) a vertical shut-off valve stem with its bottom end secured centrally of said piston, said stem extending into said central opening in the shut-off valve body,
(h) means forming a reduced diameter portion of said shut-off valve stem and providing a top head above the reduced diameter portion, said stem proportioned to cause said head to extend into said upper portion of the opening of enlarged diameter when the piston is moved upwardly, (i) regulating valve means, including a passageway leading to said central opening at said reduced diameter portion of the valve stem, for receiving chlorine gas from a source under pressure and delivering the same at reduced pressure to said shut-off valve body, (j) a tapered metering tube having its bottom end resting on said shut-off valve body, (k) a head member engaging said tube's top end, said head member having an edge flange and a central aperture with a restricted passageway forming a seat, (l) screw fasteners extending through said edge flange and threaded into said shut-off valve body to hold said metering tube to said valve body, (m) a nipple with a restricted passageway in said metering tube, said restricted passageway communicating with the metering tube and central opening in the valve body, (n) an indicating ball in said tube, (o) a ball check valve in said head above said restricted passageway and seat, (p) means providing a connection between said actuating cylinder and a differential pressure source associated with a pump, to raise the piston and permit gas flow when the pump is operating, and (q) packing means in said valve body engaging said valve stem on opposite sides of the reduced diameter portion when the valve stem is at one position, (r) water under pressure adapted to be introduced below said piston and raise the piston and valve stem to permit gas flow, the compression spring returning the piston and valve stem to gas shut off position when water pressure is reduced, (s) control of gas pressure to the valve stem and metering tube resulting in accurate determination of rate of gas flow.

5. In a chlorinator of the character and for the purpose described, (a) a base plate, (b) an actuating cylinder supported on said base plate and having an open bottom closed by said base plate, (c) a generally cylindrical shut-off valve body with a bottom annular threaded projection threaded into a top wall of said actuating cylinder, (d) said valve body having a circular central vertical opening extending entirely therethrough and communicating with said actuating cylinder, said central opening having an upper portion of enlarged diameter, (e) a piston vertically reciprocable in said actuating cylinder, (f) a compression spring in the cylinder normally biasing said piston to a bottom position in said cylinder, (g) a vertical shut-off valve stem with its bottom end secured centrally of said piston, said stem extending into said central opening in the shut-off valve body, (h) means forming a reduced diameter portion of said shut-off valve stem and providing a top head above the reduced diameter portion, said stem proportioned to cause said head to extend into said upper portion of the opening of enlarged diameter when the piston is moved upwardly, (i) a generally tubular regulating valve body having a longitudinal passageway, (j) means securing said regulating valve body against the shut-off valve body with its axis at right angles to the axis of said shut-off valve body, said two bodies having aligned passageways communicating with each other and with said longitudinal passageway of the regulating valve body and said central openings at the region of said reduced diameter portion of the shut-off valve stem, (k) a seat in said longitudinal passageway, (l) a needle valve having its stem threaded in said regulating valve body, (m) a needle valve regulating knob, (n) reducing gearing between said knob and needle valve stem, and (o) regulating valve means, including a passageway leading to said central opening, for receiving chlorine gas from a source under pressure to said shut-off valve body.

6. In a gas flow control device, (a) a source of said gas under pressure, (b) passageways conveying said gas from said source to a point of application, (c) shut-off valve means effective to discontinue flow of gas on the development of a predetermined condition in a system, and (d) a gas flow regulating valve, comprising (1) a valve seat, (2) a valve stem with a portion shaped to cooperate with the seat to control the rate of gas flow, (3) a rotatably supported regulating knob, (4) screw means controlling the position of said valve with respect to its seat, and (5) reducing gearing between said regulating knob and screw means to cause a relatively large movement of the knob to produce a small movement of the valve stem to provide finer controlled adjustment of said regulating valve, said reducing gearing includes a support, a stem to which said knob is fixed, said stem threaded into said support, its said threads having the same pitch as the threads on said screw means but progressing helically in an opposite direction, a small gear carried by said stem and a larger gear carried by screw means and meshing with said small gear.

References Cited by the Examiner

UNITED STATES PATENTS

| | | | |
|---|---|---|---|
| 468,737 | 2/1892 | Anderson | 251—205 |
| 1,178,222 | 4/1916 | Earl | 137—100 |
| 1,839,672 | 1/1932 | Hamon | 251—205 |
| 2,199,158 | 4/1940 | Hein | 251—248 |
| 2,315,512 | 4/1943 | Everson | 137—114 |
| 2,453,809 | 11/1948 | Newcomer | 251—248 X |
| 2,617,640 | 11/1952 | Hieger | 251—63 X |
| 2,621,885 | 12/1952 | Schmitt | 251—63 X |
| 2,925,242 | 2/1960 | Noon | 251—63 |
| 2,928,646 | 3/1960 | Ashbrook | 251—63 |
| 3,048,274 | 8/1962 | Lundeen | 137—100 X |
| 3,133,440 | 5/1964 | Conkling | 73—209 |
| 3,194,254 | 7/1965 | Zmek | 137—114 |

WILLIAM F. O'DEA, *Primary Examiner.*

ALAN COHAN, *Examiner.*